United States Patent
Sekine et al.

(10) Patent No.: US 8,627,918 B2
(45) Date of Patent: Jan. 14, 2014

(54) ELECTRIC POWER STEERING DEVICE

(75) Inventors: Takaaki Sekine, Fujisawa (JP); Shin Kumagai, Fujisawa (JP); Yusuke Ota, Fujisawa (JP); Yasuhiro Iwasaki, Fujisawa (JP); Yousuke Imamura, Maebashi (JP); Yusuke Kikuchi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/056,494

(22) PCT Filed: Oct. 29, 2010

(86) PCT No.: PCT/JP2010/006422
§ 371 (c)(1),
(2), (4) Date: Jul. 10, 2012

(87) PCT Pub. No.: WO2011/052232
PCT Pub. Date: May 5, 2011

(65) Prior Publication Data
US 2012/0273292 A1 Nov. 1, 2012

(30) Foreign Application Priority Data

Oct. 30, 2009 (JP) ................................. 2009-251091

(51) Int. Cl.
*B62D 5/04* (2006.01)
(52) U.S. Cl.
USPC ....................................................... 180/444
(58) Field of Classification Search
USPC ....................................................... 180/444
See application file for complete search history.

(56) References Cited

U.S. PATENT DOCUMENTS

| | | | |
|---|---|---|---|
| 5,732,790 A * | 3/1998 | Endo et al. ................. | 180/444 |
| 6,707,185 B2 | 3/2004 | Akutsu et al. | |
| 6,989,616 B2 | 1/2006 | Okubo et al. | |
| 7,913,802 B2 * | 3/2011 | Wilkes ...................... | 180/444 |
| 2009/0021091 A1 | 1/2009 | Shiino et al. | |
| 2009/0133955 A1 * | 5/2009 | Morikawa et al. .......... | 180/444 |
| 2009/0267430 A1 | 10/2009 | Imamura et al. | |
| 2009/0294205 A1 * | 12/2009 | Wilkes ...................... | 180/444 |
| 2010/0314192 A1 | 12/2010 | Nagase et al. | |

FOREIGN PATENT DOCUMENTS

| | | |
|---|---|---|
| JP | 9-136652 A | 5/1997 |
| JP | 2004-23841 A | 1/2004 |
| JP | 3593102 B2 | 11/2004 |

(Continued)

OTHER PUBLICATIONS

International Search Report dated Feb. 8, 2011 including partial English-language translation (Two (2) pages).

(Continued)

*Primary Examiner* — Tony Winner
(74) *Attorney, Agent, or Firm* — Crowell & Moring LLP

(57) ABSTRACT

An electric power steering device includes a steering column in which a steering shaft for transmitting a steering torque is built, an electric motor for transmitting a steering assist force through a gear mechanism in a gearbox to the steering shaft, and a control device for driving and controlling the electric motor. The control device includes a drive circuit module having a switching element for driving the electric motor, and a control module that is mounted on the gearbox for controlling the drive circuit module. The drive circuit module is mounted on a housing of the electric motor.

15 Claims, 10 Drawing Sheets

(56) References Cited

FOREIGN PATENT DOCUMENTS

| | | |
|---|---|---|
| JP | 2007-276742 A | 10/2007 |
| JP | 2008-109837 A | 5/2008 |
| JP | 2008-285142 A | 11/2008 |
| JP | 2008-290614 A | 12/2008 |
| JP | 2009-23418 A | 2/2009 |
| JP | 2009-113536 A | 5/2009 |
| JP | 2009-137479 A | 6/2009 |
| JP | 2009-241788 A | 10/2009 |
| WO | WO 2007/026894 A1 | 3/2007 |
| WO | WO 2008/146664 A1 | 12/2008 |
| WO | WO 2009/101779 A1 | 8/2009 |

OTHER PUBLICATIONS

English-language version of previously submitted Japanese-language International Search Report dated Feb. 8, 2011, filed with the USPTO on Feb. 23, 2011. (Three (3) pages).

International Preliminary Report on Patentability dated May 28, 2012 (five (5) pages).

Chinese Office Action dated Sep. 24, 2012 including English-language translation Twelve (12) pages).

Japanese-language Office Action dated Feb. 26, 2013 with English translation (Four (4) pages).

Chinese-language Office Action dated Apr. 9, 2013 with English translation (Fourteen (14) pages).

Japanese Office Action dated Oct. 1, 2013 {Two (2) pages}.

* cited by examiner

F I G. 5
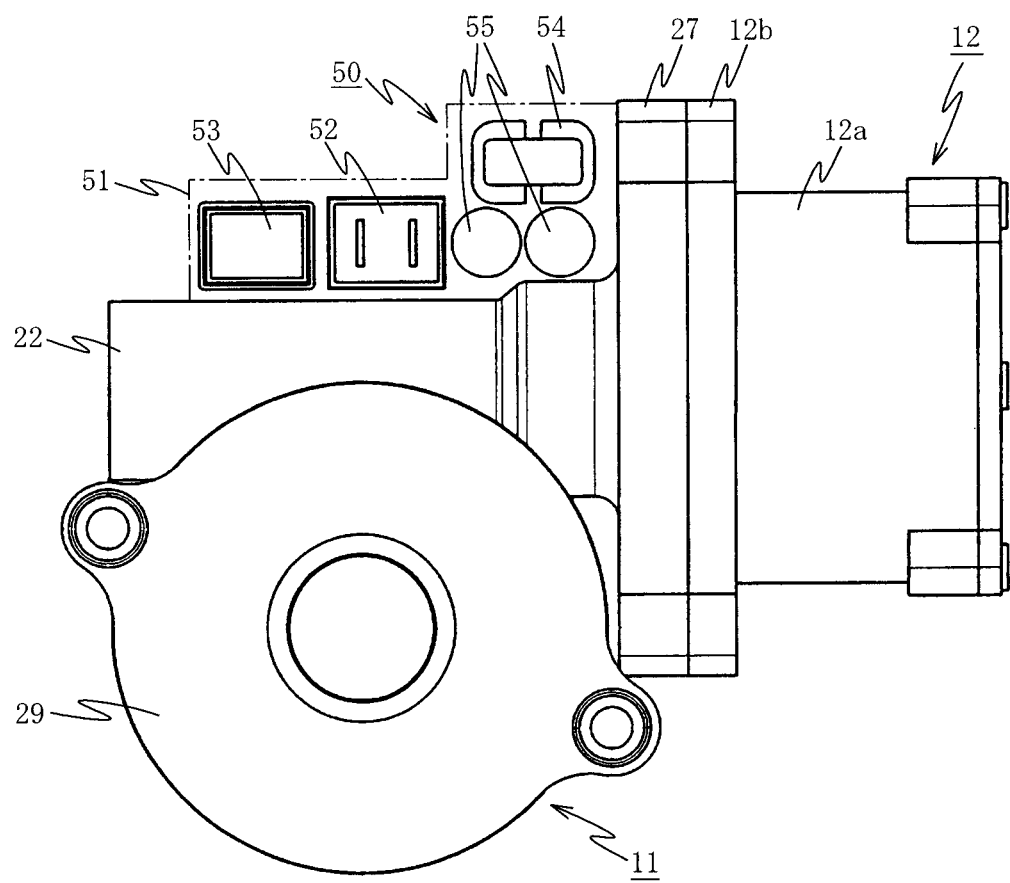

ELECTRIC POWER STEERING DEVICE

TECHNICAL FIELD

The present invention relates to electric power steering devices of column type configured to transmit the steering assist force generated by an electric motor through a reduction mechanism in a reduction gearbox to a steering shaft.

BACKGROUND ART

As an electric power steering device of this type, there has been known an electric power steering device configured in such a manner that a control circuit unit having a power element therein for driving a motor, in a casing, on a housing of a motor for assisting a steering force of the steering wheel. Lead wires connected to the power element in the control circuit unit are connected through a trunk wire via openings arranged at the housing and casing to the motor coil (for example, see Patent Document 1).

Likewise, Patent Documents 2 to 4 also describe the configuration in which a control device for controlling the motor is mounted on the motor and a terminal of the motor is connected to that of the control device.

Meanwhile, there has also been known the configuration in which the electric motor for transmitting the steering assist force to the steering shaft is coupled through the reduction gear mechanism in the reduction gearbox to the steering shaft, so that the control unit for controlling the electric motor is mounted in the reduction gearbox (for example, see Patent Document 5).

PRIOR ART DOCUMENTS

Patent Documents

Patent Document 1: JP Patent Number 3593102
Patent Document 2: JP 2008-109837 A
Patent Document 3: JP 2004-23841 A
Patent Document 4: WO 2007/026894 A
Patent Document 5: JP 2007-276742 A

SUMMARY OF THE INVENTION

Problem to be Solved

In this regard, in the conventional examples of the above-described Patent Documents 1 to 4, the control device mounted in the housing of the motor provides an advantage of enabling the electrical connection between the motor coil and the control device at a short distance, in the conventional examples described in the above patent Documents. However, in consideration of the heat produced by the motor itself when the electric power steering device is used, it is necessary to provide a heat dissipating means such as a heat sink to dissipate the heat produced by the power element for driving the motor in using the electric power steering device. For this reason, there are unsolved problems that the size of the control device becomes greater, and in addition, it is very difficult to reduce the quantity thereof.

Besides, in general, the steering torque transmitted to the steering mechanism has to be detected for the motor to generate the steering assist force. A torsion bar is interposed in the steering shaft and a torque sensor that detects a torsion amount of the torsion bar is arranged at the external side of the steering shaft. Thus, the electrical connection between the torque sensor and the control device has to be established by harness. This results in the external exposure of the harness, and poses an unsolved problem of easily receiving noise. Thus, there are unsolved problems that the harness is exposed outwardly and easily receives noise.

On the other hand, in the conventional example of Patent Document 5, the control unit is arranged on the reduction gearbox having a large heat-mass. Accordingly, this produces an advantage that the heat dissipating means such as a heat sink is no longer needed. Since the control unit itself has a large volume, however, the control unit protrudes from the reduction gearbox and the entire configuration including the control unit becomes larger in size. Additionally, the distance between the electric motor and the control unit is longer than that of a case where the control unit is mounted on the motor housing. This poses an unsolved problem that the degraded efficiency caused by increased wiring resistance is inevitable. Furthermore, the control unit is mounted in a space necessary for an impact Energy Absorption (EA) stroke at the time of vehicle crash. This also poses an unsolved problem that it is difficult to secure the impact Energy Absorption (EA) stroke performance.

That is to say, as shown in FIG. 11, an electric power motor 101 is coupled to a reduction gearbox 100. A control unit 103 is attached to the steering wheel (not shown) side of a worm housing unit 102 for housing a worm coupled to a rotation shaft of the electric power motor 101, in the reduction gearbox 100. Therefore, the allowance for the impact Energy Absorption (EA) stroke is proportional to an occupied distance Lo between the center axis of the worm housed in the worm housing unit 102 separately crossing the steering shaft, namely the center axis of the worm housing unit 102, and an end of the steering wheel side of the control unit 103 attached to the worm housing unit 102. Herein, in order to secure the impact Energy Absorption (EA) stroke, whether or not there is a member for restricting the stroke is important, when viewed from the steering wheel side. It is desirable that such a member should be arranged on the further side, namely the front side of the vehicle. Therefore, it is preferable that the above-described occupied distance Lo should be as short as possible for securing the impact Energy Absorption (EA) stroke. It is therefore difficult to shorten the occupied distance Lo in the conventional example described in Patent Document 5.

Therefore, the present invention has been made in view of the unsolved problems in the conventional examples described heretofore, and has an object of providing an electric power steering device capable of solving the unsolved problems, while securing advantages of a control device mounted on a motor housing and mounted on a gearbox.

Solution to the Problem

In order to achieve the above object, according to an aspect of the present invention, there is provided an electric power steering device comprising: a steering column in which a steering shaft for transmitting a steering torque is built; an electric motor for transmitting a steering assist force through a gear mechanism in a gearbox to the steering shaft; and a control device for driving and controlling the electric motor, wherein the control device including at least: a drive circuit module including a switching element for driving the electric motor, and mounted on a housing of the electric motor; and a control module, mounted on the gearbox, for controlling the drive circuit module.

Furthermore, according to another aspect of the present invention, there is provided an electric power steering device comprising: a steering column in which a steering shaft for transmitting a steering torque is built; an electric motor for transmitting a steering assist force through a gear mechanism in a gearbox to the steering shaft; and a control device for driving and controlling the electric motor, wherein the control device including: a drive circuit module including a switching element for driving the electric motor, and mounted on a housing of the electric motor; a control module for controlling the drive circuit module, and mounted on a surface crossing a center axis of the gearbox; and a connector module including a connector for external connection and a noise-suppressing part, and mounted on a surface crossing the center axis of the gearbox and adjacent to the control module.

Furthermore, in the above electric power steering device, the drive circuit module is mounted on a flange portion in the housing of the electric motor.

Furthermore, in the above electric power steering device, steering torque detecting means is arranged at an inner circumferential surface opposing the steering shaft of the gearbox, the control module is arranged at an external circumferential surface side opposing the steering torque detecting means, and a connection terminal of the steering torque detecting means is electrically connected directly to the control module.

Furthermore, in the above electric power steering device, the gear mechanism includes: a worm wheel coupled to the steering shaft; and a worm coupled to an output shaft of the electric motor meshing the worm wheel.

Furthermore, in the above electric power steering device, the control module is arranged closely to an intersection point of an outer circumferential edge of a worm wheel housing portion for housing the worm and the center axis of the worm, along a plane surface orthogonally crossing the center axis of the steering shaft.

Furthermore, in the above electric power steering device, the electric motor is composed of a brushless motor including a rotation angle detecting device built therein, and the drive circuit module is composed of a multi-phase inverter in accordance with a number of phases of the brushless motor.

Advantageous Effects of the Invention

According to the present invention, the control device for driving and controlling an electric motor is provided with at least: a switching element for driving the electric motor; a drive circuit module mounted on a housing of the electric motor; and a control module, for controlling the drive circuit module, mounted on the gearbox. This enables the shortest distance between the drive circuit module on which the wiring resistance is greatly influenced and a coil for driving the electric motor, thereby minimizing the reduction in the efficiency caused by the wiring resistance.

In addition, the control module for controlling the drive circuit module is mounted on the gearbox. When the steering torque detecting means is arranged in the gearbox, both of the electrical connection between the control module and the steering torque detecting means and the electrical connection between the control module and drive circuit module can be established at a short distance without external exposure. Also, the wiring element can be minimized.

Furthermore, a connector for external connection or a noise-suppressing part is mounted above the gearbox to be independent of the control module. This allows them to be arranged closely to both of the control module and the drive circuit module. It is therefore possible to improve the efficiency caused by the wiring resistance in the heavy current system and also to improve the noise tolerated amount caused by the shortened wiring in the signal system. Moreover, the connector module having a connector shape corresponding to every vehicle manufacturer is prepared, thereby eliminating the need for manufacturing different modules for each vehicle manufacturer to be delivered and improving the adaptability.

BRIEF DESCRIPTION OF THE DRAWINGS

FIG. 5 is a rear view of the electric power steering device.

DESCRIPTION OF EMBODIMENTS

Figure 1:
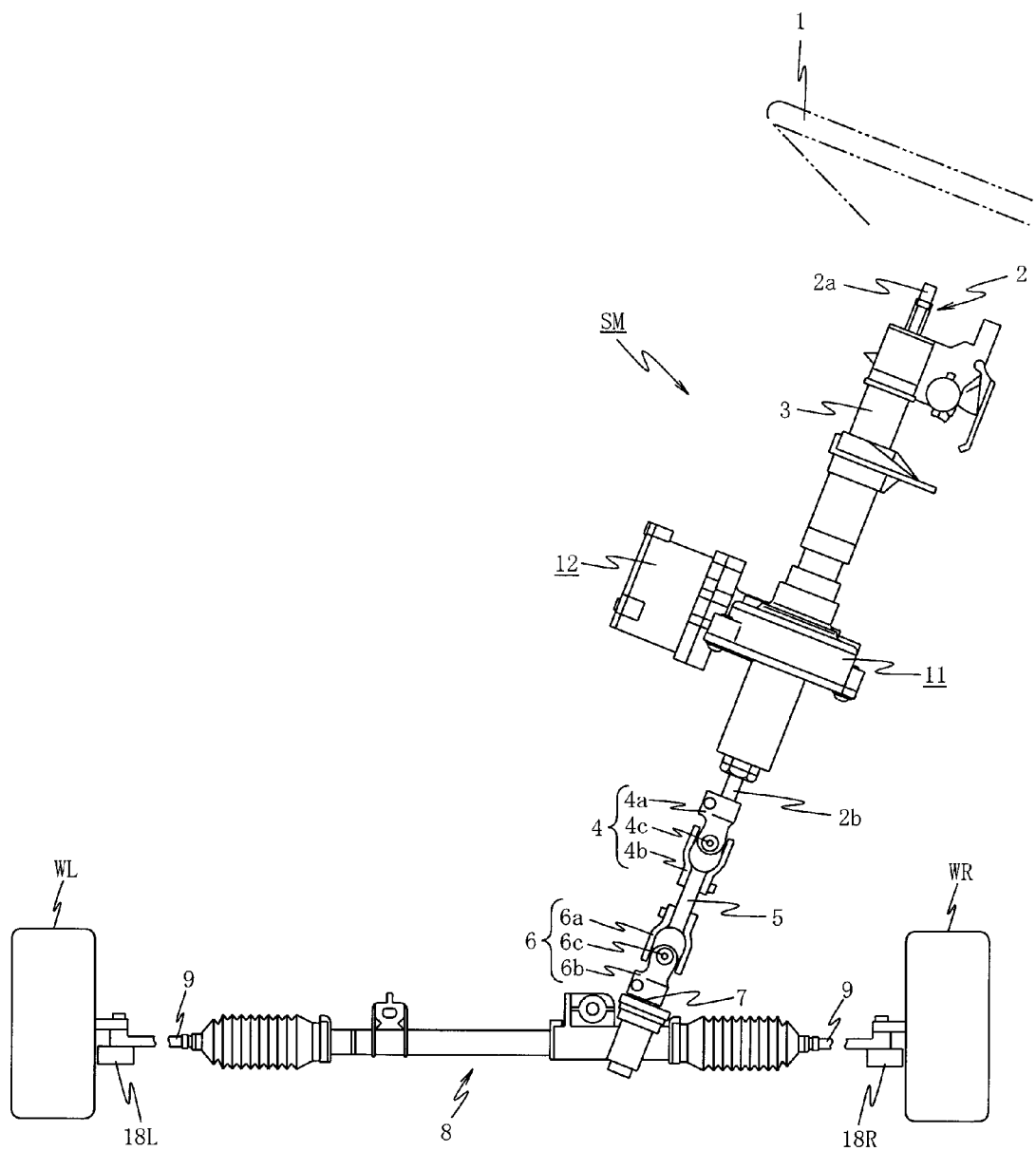
FIG. 1 is a schematic configuration view of a steering mechanism equipped with an electric power steering device according to the present invention.

Hereinafter, embodiments of the present invention will be described with reference to the drawings. FIG. 1 is a schematic configuration view illustrative of a steering mechanism according to an embodiment of the present invention.

In FIG. 1, SM indicates a steering mechanism. The steering mechanism SM is provided with a steering shaft 2 including: an input shaft 2a to which a steering force exerted to a steering wheel 1 by a driver is transmitted; and an output shaft 2b coupled to the input shaft 2a via a torsion bar, not illustrated. The steering shaft 2 is rotatably included in a steering column 3, one end of the input shaft 2a is coupled to the steering wheel 1 and the other end of the input shaft 2a is coupled to the torsion bar, not illustrated.

Then, the steering force transmitted to the output shaft 2b is transmitted to an intermediate shaft 5 through a universal joint 4 including two yokes 4a and 4b and a cross-shaped coupling portion 4c connecting them. The steering force is further transmitted to a pinion shaft 7 through a universal joint 6 including two yokes 6a and 6b and a cross-shaped coupling portion 6c connecting them. The steering force transmitted to the pinion shaft 7 is transformed into a straight movement in a vehicle width direction by a steering gear mechanism 8. Such transformed movement is transmitted to left and right tie rods 9. Such tie rods 9 rotate steering wheels WL and WR.

The output shaft 2b of the steering shaft 2 is provided with: a reduction gearbox 11 in which a gear mechanism for transmitting the steering assist force to the output shaft 2b is built; and an electric motor 12 including, for example, a three-phase brushless motor for generating the steering assist force, the electric motor 12 being coupled to the reduction gearbox 11. There are provided with: a reduction gearbox 11 including a gear mechanism for transmitting the steering assist force to the output shaft 2b of the steering shaft 2; and an electric motor 12, such as a three-phase brushless motor, generating the steering assist force and coupled to the reduction gearbox 11.

Figure 2:
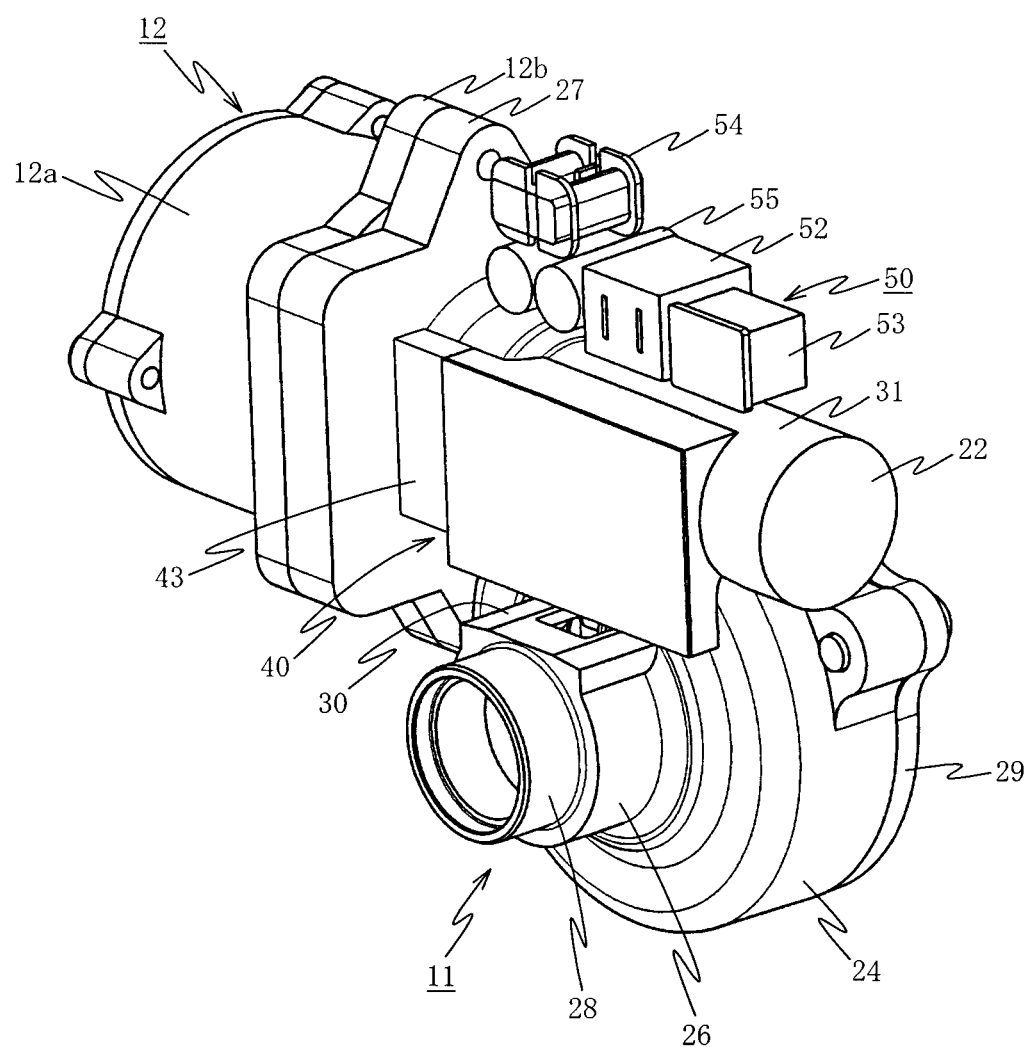
FIG. 2 is a perspective view of the electric power steering device of FIG. 1.

The electric motor 12, referring to FIG. 2, is attached to a gearbox flange 27 arranged in a tangential direction on the outer circumferential side of a worm wheel housing portion 24, as will be described later, of the reduction gearbox 11.

Moreover, a control module 40 and a connector module 50, which are arranged in series in an axial direction of the electric motor 12, are attached on the right side of the gearbox flange 27 in the reduction gearbox 11.

The reduction gearbox 11 is formed by, for example, die-casting of any one of, for example, aluminum, aluminum alloy, magnesium, and magnesium alloy having high thermal conductivity.

Figure 4:
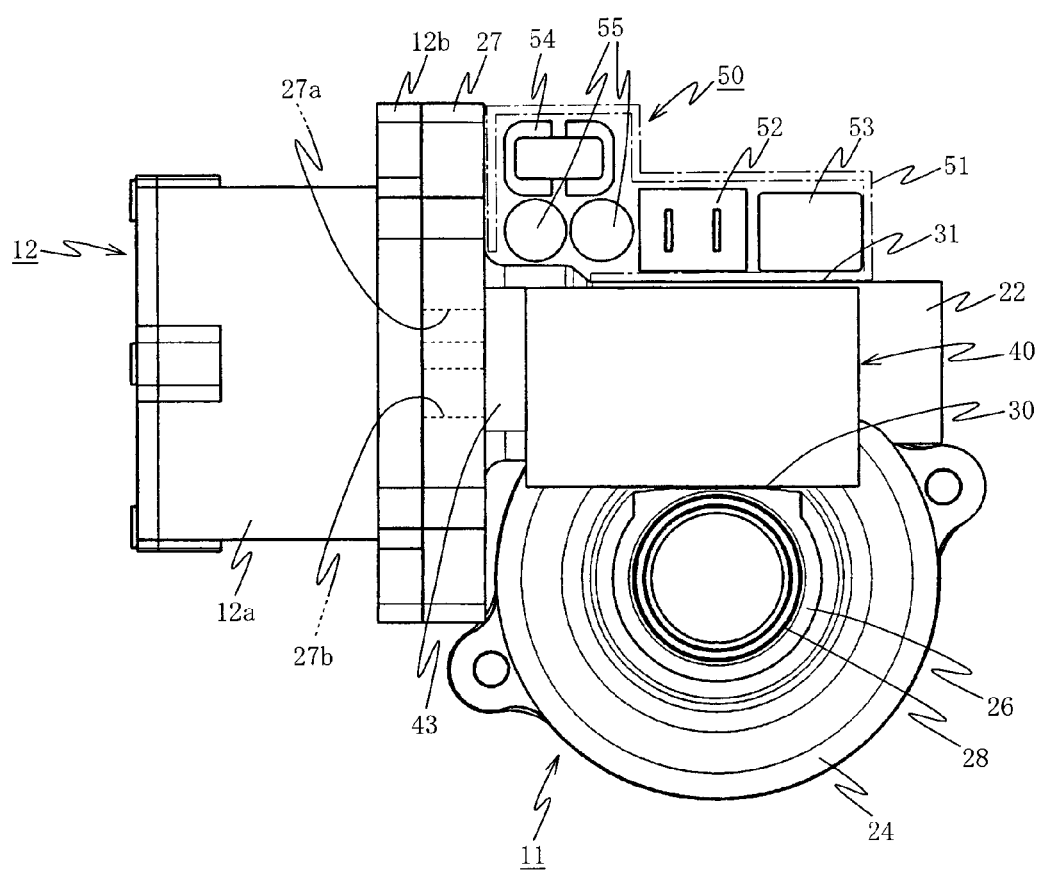
FIG. 4 is a front view of the electric power steering device.
Figure 6:
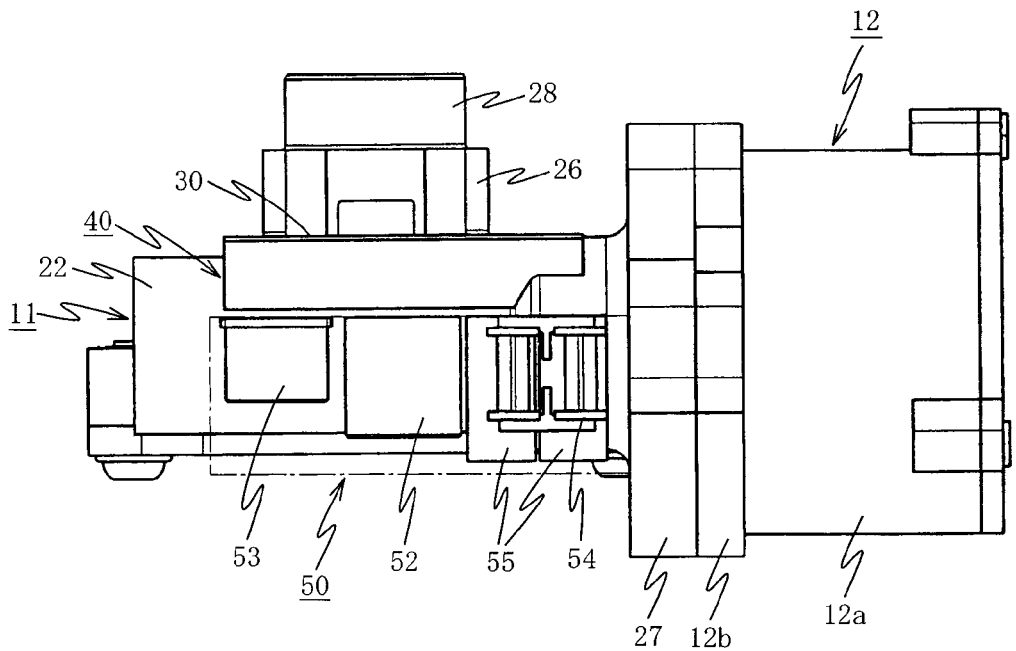
FIG. 6 is a right side view of the electric power steering device.

The reduction gearbox 11 is formed by, for example, die-casting of a high thermal conductive material such as one of, for example, aluminum, aluminum alloy, magnesium, and magnesium alloy. The reduction gearbox 11, referring now to FIG. 4, FIG. 5, and FIG. 6, is provided with: a worm housing portion 22 for housing a worm 21; and a worm wheel housing portion 24, arranged at the lower side of worm housing portion 22, with the vehicle front side opened, for housing a worm wheel 23 having a center axis separately crossing a center axis of the worm housing portion 22 and meshing with the worm.

In addition, the reduction gearbox 11 includes: a torque sensor housing portion 26 for housing a torque sensor 25 integrally and coaxially coupled to the vehicle front side of the worm wheel housing portion 24; and an in low opening (not illustrated) arranged at an open end face of the worm housing portion 22. The reduction gearbox 11 also includes: the gearbox flange 27 for attaching the electric motor 12; a cylindrical column attaching portion 28 to be press fit onto an end of the steering column 3 formed at an edge of the vehicle rear side of the torque sensor holding portion 26; and a box cover 29 for covering an open end face of the worm wheel housing portion 24.

The reduction gearbox 11 further includes: a control module attaching portion 30 partially arranged at the worm housing portion 22, the worm wheel housing portion 24, and the torque sensor housing portion 26 so as to attach the control module 40 onto a face arranged in the axial direction of the steering shaft 2, that is, in the worm axis direction separately crossing the center axis of the reduction gearbox 11; and a connector module attaching portion 31, separately crossing the center axis of the reduction gearbox 11, for attaching the connector module 50 provided closely to the gearbox flange 27 on the worm housing portion 22, onto a face adjacent to the control module attaching portion 30.

Figure 8:
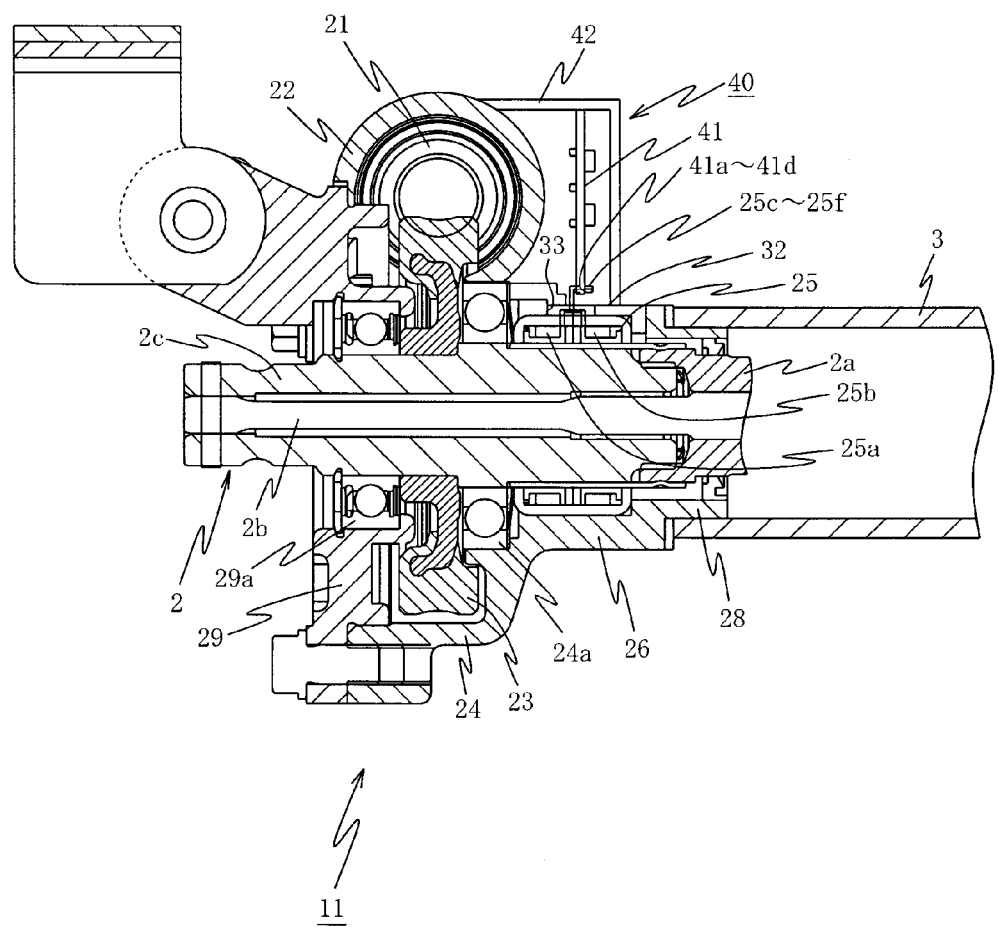
FIG. 8 is a sectional view of a reduction gearbox.

Additionally, the torque sensor 25, as illustrated in a magnified manner in FIG. 8, is configured such that a pair of detecting coils 25a and 25b, each serving as a torque detecting element, magnetically detect the torsion state between the input shaft 2a and an output shaft 2c of the steering shaft 2 so as to detect the steering torque that has been transmitted to the steering shaft 2.

External connection terminals 25c, 25d and 25e, 25f that externally protrude in parallel with the direction orthogonal to the center axis of the steering column 3 are connected to a start point of winding and an end point of winding of the pair of detecting coils 25a and 25b, respectively. Protruding portions of these external connection terminals 25c to 25f are folded at the middle to be in parallel with the center axis of the steering column 3 and to have a letter L shape, and, as illustrated in FIG. 8, protrude upwardly from an opening 33 arranged at a guide surface 32 for guiding the bottom surface of the control module 40 arranged at right angle to the control module attaching portion 30.

Then, as illustrated in FIG. 8, the output shaft 2c of the steering shaft 2 is rotatably supported by a ball bearing 29a secured to the inner circumferential surface of the box cover 29.

In addition, referring back to FIG. 4, the gearbox flange 27 for attaching a flange portion 12b of the electric motor 12 is provided with: a through hole 27a for inserting therethrough a power feeding terminal 61 for a drive circuit module 60 mounted on the flange portion 12b of the electric motor 12; and a through hole 27b for inserting therethrough a gate control signal terminal 62 and a resolver signal terminal 63.

Figure 9:
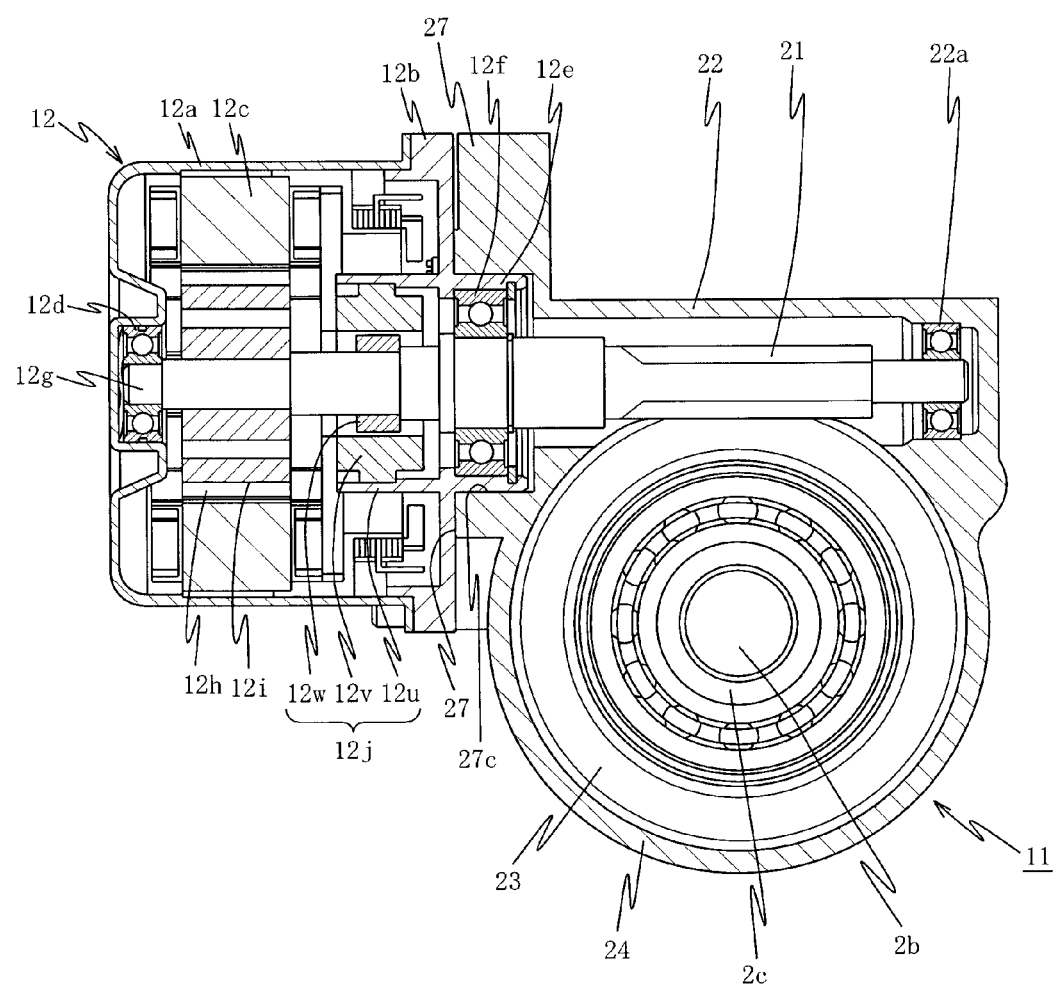
FIG. 9 is a sectional view of an electric motor.

Furthermore, the electric motor 12, as illustrated in FIG. 9, includes: a motor frame 12a having a cylindrical shape with an opened front end and a closed bottom; and the flange portion 12b that covers the front end of the motor frame 12a and that is attached to the reduction gearbox 11. In the motor frame 12, disposed is a motor stator 12c around which an excitation coil is wound. An output shaft 12g is rotatably supported by a rear side bearing 12d secured to the bottom of the motor frame 12a in the motor stator 12c, and a front side bearing 12f secured to an in low protrusion 12e protruded by the flange portion 12b. A surface magnet type of a motor rotor 12i having a permanent magnet 12h formed at the surface thereof is secured at a position to oppose the motor stator 12c of the output shaft 12g. A resolver 12j serving as a rotor rotation angle detector for detecting the rotation angle of the rotor is provided at a position to oppose the flange portion 12b of the motor rotor 12i.

Figure 3:
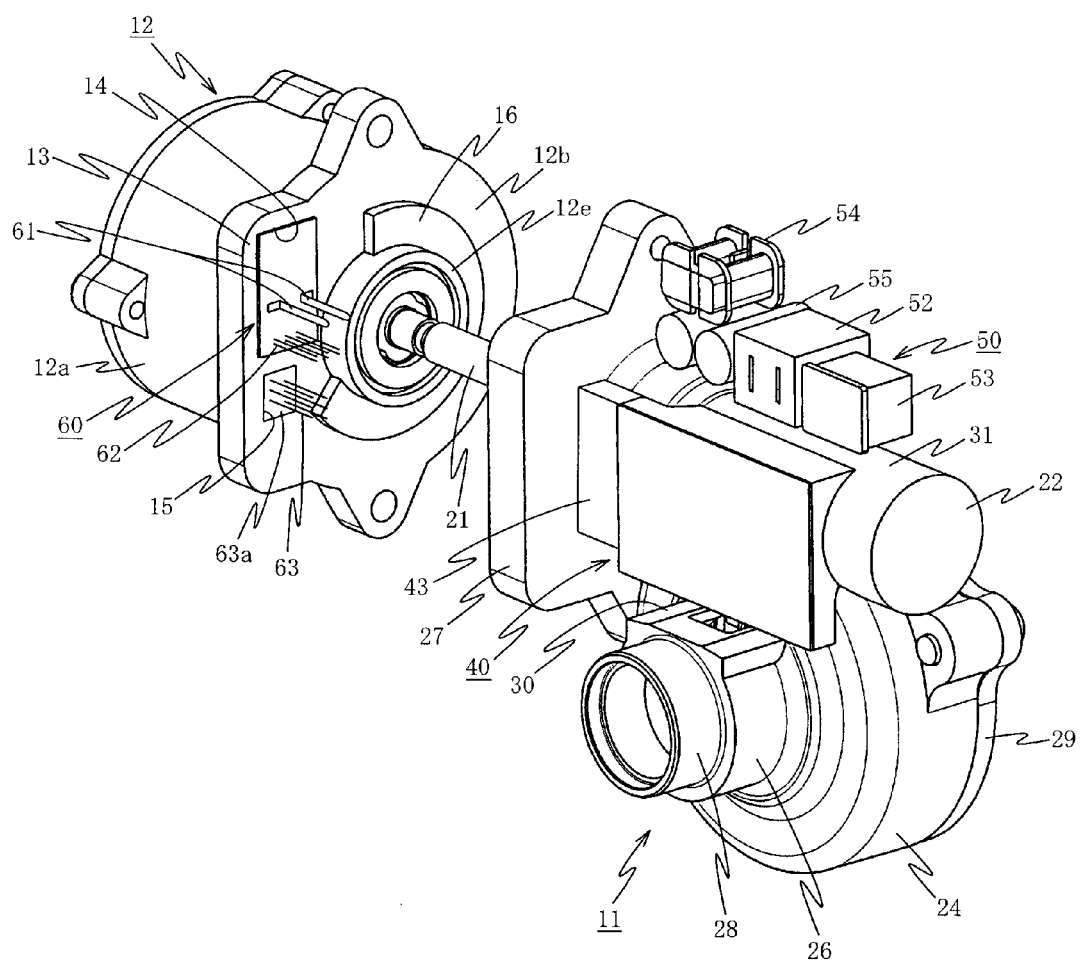
FIG. 3 is an exploded perspective view of FIG. 2.

Herein, the flange portion 12b, as illustrated in FIG. 3, a rectangular swelling portion 13 that swells in the axial direction of the reduction gearbox 11 is formed at a position corresponding to the column attaching portion 28 side of the reduction gearbox 11. The drive circuit module 60 including a three-phase inverter for driving the electric motor 12 is housed in a rectangular housing recess portion 14 arranged at the rectangular swelling portion 13 so as not to protrude from the surface of the flange portion 12b. In this regard, the three-phase inverter included in the drive circuit module 60 has a configuration in which, for example, three switching arms are connected in parallel with each other between the positive line and the negative line, the three switching arms each having two semiconductor switching elements each made of a power MOSFET being connected in series. Moreover, the drive circuit module 60 may be configured to include a current sensor for detecting the motor-conducting current value, in addition to the three-phase inverter.

There are provided: the power feeding terminal 61 electrically connected to the positive line and negative line individually; and the gate control signal terminal 62 to be connected to the gate of each switching element. The terminals 61 and 62 provided at the surface of the drive circuit module 60 to protrude therefrom. Additionally, the resolver 12j includes: a resolver stator 12v secured to the inner circumferential surface of a cylindrical portion 12u oppositely extending to and integrally formed with the in low protrusion 12e in the flange portion 12b; and a resolver rotor 12w secured to the output shaft 12g inserted into the resolver stator 12v.

When a sine-wave excitation signal $f(t)=A \cdot \sin(\omega t)$ is input from an external signal processing circuit, the resolver stator 12v outputs sine-wave and cosine-wave resolver signals Ys ($=K \cdot \sin(\theta) \cdot f(t)$) and Yc ($=K \cdot \sin(\theta) \cdot f(t)$) according to the rotation angle $\theta$ of the rotor.

For this reason, there are provided, for example, six resolver signal terminals including: a pair of an excitation signal input terminal and a resolver signal output terminal for inputting and outputting the excitation signal f(t) and the resolver signals Ys and Yc.

In addition, a terminal housing recess portion 15 is arranged below the rectangular housing recess portion 14 of the rectangular swelling portion 13 in the flange portion 12b. There is provided at the terminal housing recess portion 15 a resolver signal terminal 63 electrically connected to the resolver 12j built in the electric motor 12. The base of the resolver signal terminal 63 is covered with a signal terminal insulation 63a made of a synthetic resin having a rectangular parallelepiped shape.

Furthermore, there is provided, at an external circumferential side of the in low protrusion 12e of the flange portion 12b, a disc portion 16 with a cutout positionally corresponding to the drive circuit module 60.

Moreover, the output shaft 12g of the electric motor 12 is integrally formed with the worm 21, as illustrated in FIG. 9. The other end of the worm 21 is rotatably supported by a bearing 22a disposed at the bottom of the worm housing portion 22 of the reduction gearbox 11. Consequently, the output shaft 12g integrally formed with the worm 21 is supported by the three bearings 12d, 12f, and 22a. When the output shaft 12g is separated from the worm 21, two bearings are respectively needed, namely four bearings are needed in total. Therefore, the length of one bearing can be shorter, and at the same time, a coupling portion for coupling the output shaft 12g and the worm 21 can be eliminated, thereby shortening this length, too.

Then, when the flange portion 12b of the electric motor 12 abuts the gearbox flange 27, an end of the power feeding terminal 61 is caused to extend through the through hole 27a into the control module 40. Ends of the gate control signal terminal 62 and the resolver signal terminal 63 are caused to extend through the through hole 27b into the control module 40.

The control module 40, referring now to FIG. 8, is configured with: a circuit board 41 on which arithmetic processing units such as a motor current detecting IC, a torque operation IC, and a microcomputer are arranged to be spaced apart from the control module attaching portion 30 of the reduction gearbox 11; and a cover 42 attached to the control module attaching portion 30 to cover the entire of the circuit board 41, and made of, for example, a synthetic resin. Additionally, the circuit board 41 is provided at its lower side with through holes 41a to 41d for inserting therethrough external connection terminals 25c to 25f of the torque sensor 25.

Furthermore, the control module 40 is formed with a connector 43 extending to be in contact with the gearbox flange 27, the connector 43 electrically connecting the power feeding terminals 61 and the gate control signal terminals 62 of the drive circuit module 60 mounted on the electric motor 12, and the resolver signal terminals 63 of the resolver 12j built in the electric motor 12.

Then, the connector module attaching portion 31 of the reduction gearbox 11 is attached with a connector module 50. As to such a connector module 50, a power supply connector 52, a signal connector 53, a coil 54 as a noise-suppressing part, and a smoothing condenser 55 are housed in an insulation case 51 indicated by a dashed-dotted line in FIG. 4 to FIG. 6.

Electric wiring connected to the battery (not illustrated) is inserted into the power supply connector 52 from the vehicle front side. Network signal wiring such as a Controller Area Network (CAN) for transmitting and receiving data to and from control devices of various parts in a vehicle is inserted into the signal connector 53 from the vehicle front side. Subsequently, direct-current power that has been subjected to noise suppression and smoothed after being output from the connector module 50 is supplied through a connection terminal, not illustrated, to the circuit board 41 of the control module 40. At the same time, a signal input from the signal connector 53 is supplied through a control terminal, not illustrated, to the circuit board 41.

In this regard, the control module 40, referring back to FIG. 2, can be mounted such that the center position of the control module 40 is substantially arranged closely to an intersection point of the outer circumferential edge of the worm wheel housing portion 24 of the gearbox 11 and the worm 21, that is the center axis of the output shaft 12g of the electric motor 12, when viewed from the front surface.

Next, the operation of the above embodiment will be described.

In the electric power steering device according to the present embodiment, the electric motor 12 is attached to the reduction gearbox 11 by abutting the flange portion 12b of the electric motor 12 with the gearbox flange 27 of the reduction gearbox 11, and in addition, by in low coupling the in low protrusion 12e to an in low hole (not illustrated) of the gearbox flange 27. In this situation, the worm 21 integrally coupled to the output shaft 12g of the electric motor 12 is inserted into the worm housing portion 22 of the reduction gearbox 11, and is housed in the worm wheel housing portion 24 to mesh the worm wheel 23 coupled to the output shaft 2c of the steering shaft 2.

Simultaneously, the power feeding terminals 61 and the gate control signal terminals 62 of the drive circuit module 60, and the resolver signal terminals 63 of the resolver 12j, protruding along the output shaft 12g from an end face of the flange portion 12b, are inserted through the insertion holes 27a and the insertion holes 27b arranged at the gearbox flange 27, respectively, and are electrically connected to the connector 43 of the circuit board 41 in the control module 40.

In addition, when the flange portion 12b of the electric motor 12 abuts the gearbox flange 27 of the reduction gearbox 11 with the electric motor 12 assembled with the reduction gearbox 11, a gap is secured so that the drive circuit module 60 housed in the rectangular housing recess portion 14 should not be press welded.

Thus, after the completion of mounting of the electric power steering device having the above configuration on a vehicle, power is supplied from the battery through the connector module 50 to the control module 40 with the ignition switch, not illustrated, of the vehicle switched on. Then, a steering assist control process is implemented by an arithmetic processing device such as a microcomputer or the like, and a steering assist current instruction value is then calculated based upon the detection value of the torque sensor 25 and the vehicle speed sensor, not illustrated. An electric current feedback process is implemented based upon the above steering assist current instruction value and the motor current detected by the motor current detecting portion, so as to calculate a voltage instruction value. A gate drive signal of the switching element included in the drive circuit module 60 is formed based upon the voltage instruction value, so the gate drive signal is supplied to the drive circuit module 60. Thus, a three-phase alternating drive current is flown across the three-phase coil of the electric motor 12 so as to drive the steering assist force to be generated necessary for forward or reverse rotation of the electric motor 12.

Accordingly, the steering assist force is generated in accordance with the steering torque of the steering wheel 1 from the electric motor 12, and the steering assist force is then transmitted through the worm 21 and the worm wheel 23 to the output shaft 2c of the steering shaft 2, thereby making it possible to steer the steering wheel 1 with a light steering force.

In this manner, according to the above embodiment, the control device for driving and controlling the electric motor 12 is divided into three modules of the control module 40, the connector module 50, and the drive circuit module 60. Therefore, the design flexibility is improved in locating these modules at optimal positions with these modules arranged closely to each other, thereby downsizing the entire configuration.

Additionally, the power feeding terminals 61, the gate signal terminals 62, and the resolver signal terminals 63 are directly connected to the connector 43 of the control module 40 through the through holes 27a and 27b arranged at the gearbox flange 27 of the reduction gearbox 11, thereby securing the electric connection between the drive circuit module 60 and the resolver 12j mounted on the electric motor 12 and the control module 40. For this reason, unlike the conventional device, none of the power feeding terminal, the control signal terminal, or the resolver signal terminal protrudes externally in a radial direction from the outer circumferences of the reduction gearbox 11 and the electric motor 12, and the motor harness or the connecting code is no longer necessary for connection. Accordingly, the wiring loss occurring when the motor harness is used can be reduced and an adverse affect is not given by a foreign noise or ferromagnetic field, thereby ensuring superior signal reliability. Moreover, even if the vehicle side members are disposed around the electric power steering device, the electrical connecting portion of the electric power steering device does not interfere with such members, thereby achieving superior vehicle mounting layout performance.

Furthermore, the drive circuit module 60 including the three-phase inverter for driving the electric motor 12 is directly mounted on the electric motor 12, thereby allowing internal connection of the three-phase alternating current output terminal of the drive circuit module 60 and the three-phase coil of the electric motor 12. Therefore, this eliminates the necessity of providing a power-supply bus bar that externally protrudes at the electric motor 12. Additionally, the drive circuit module 60 mounted on the flange portion 12b of the electric motor 12 enables the minimization of the length of the electrical connecting portion connecting between the three-phase alternating current output terminal of the drive circuit module 60 and the three-phase coil of the electric motor 12. Accordingly, the wiring resistance is reduced for improving the efficiency.

Figure 7:
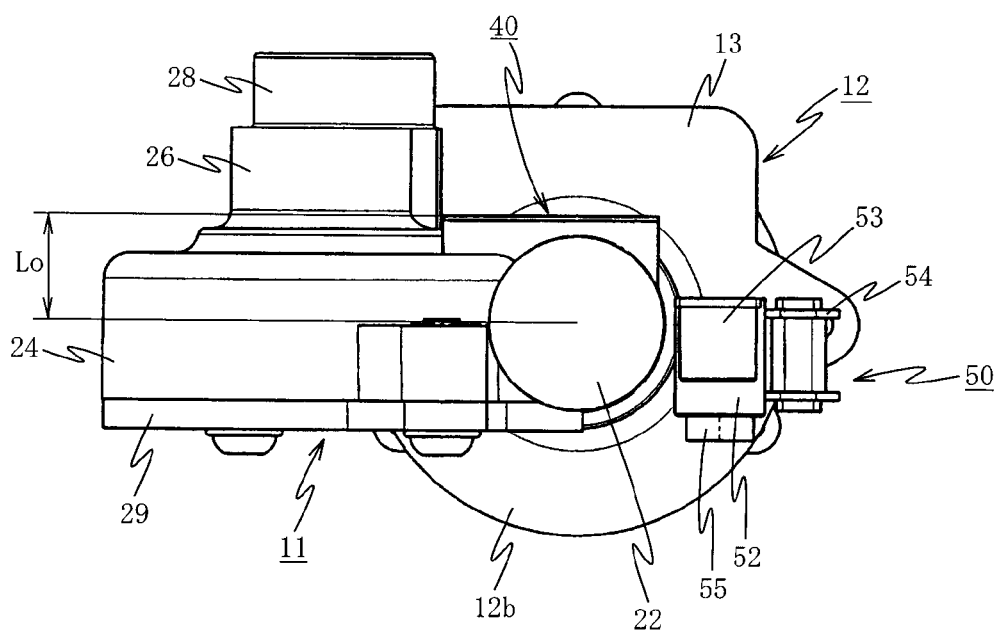
FIG. 7 is a left side view of the electric power steering device.

Furthermore, the control module 40 is mounted on the torque sensor housing portion 26 of the reduction gearbox 11, whereby the through holes 41a to 41d of the circuit board 41 and the external connection terminals 25c to 25f are directly and electrically connected. Also in this case, the wiring no longer protrudes externally, thereby enabling the minimization in the length of the wiring members therebetween. Moreover, only the circuit board 41 and the connector 43 are provided in the control module 40, thereby enabling reduction in the thickness in the axial direction of the steering shaft 2. Accordingly, as illustrated in FIG. 7, the occupied distance Lo between the center axis of the above-described worm housing portion 22 and the end portion of the steering wheel side of the control module 40 can be shortened, thereby easily ensuring the impact Energy Absorption (EA) stroke performance at the time of vehicle crash.

Furthermore, it is made possible to arrange the connector module 50 on the worm housing portion 22 closely to the control module 40 and the drive circuit module 60, whereby the efficiency is improved by the reduction in the wiring resistance of the heavy current system and the noise permissible dose is improved by shortening the signal form wiring. Moreover, the connector module 50 is provided to be independent of the control module 40 and the drive circuit module 60. If the connector shape is varied depending on the vehicle manufacturer, it is merely necessary to produce multiple kinds of the connector modules 50 only in accordance with the vehicle manufacturer. This eliminates the necessity of newly producing the entire control device, thereby improving the adaptability.

Moreover, since the brushless motor is employed as the electric motor 12, the length of the axial direction can be shorter than that of a brush motor. In addition, there is no loss caused by the contact resistance of the brush, and at the same time, the wire harness for conducting the motor is eliminated. It is therefore made possible to provide an electric power steering device that achieves a high output efficiency, which cannot be achieved only by any one of the low-loss methods.

Additionally, the worm 21 is integrally formed with the output shaft 12g of the electric motor 12, thereby eliminating the coupling for connecting therebetween. Simultaneously, the number of the bearings for rotatably supporting can be reduced to three, thereby making it possible to attach the electric motor 12 closely to the worm housing portion 22 of the gearbox 11. Accordingly, the protruding length of the electric motor 12 can be shortened by the corresponding length.

Figure 10:
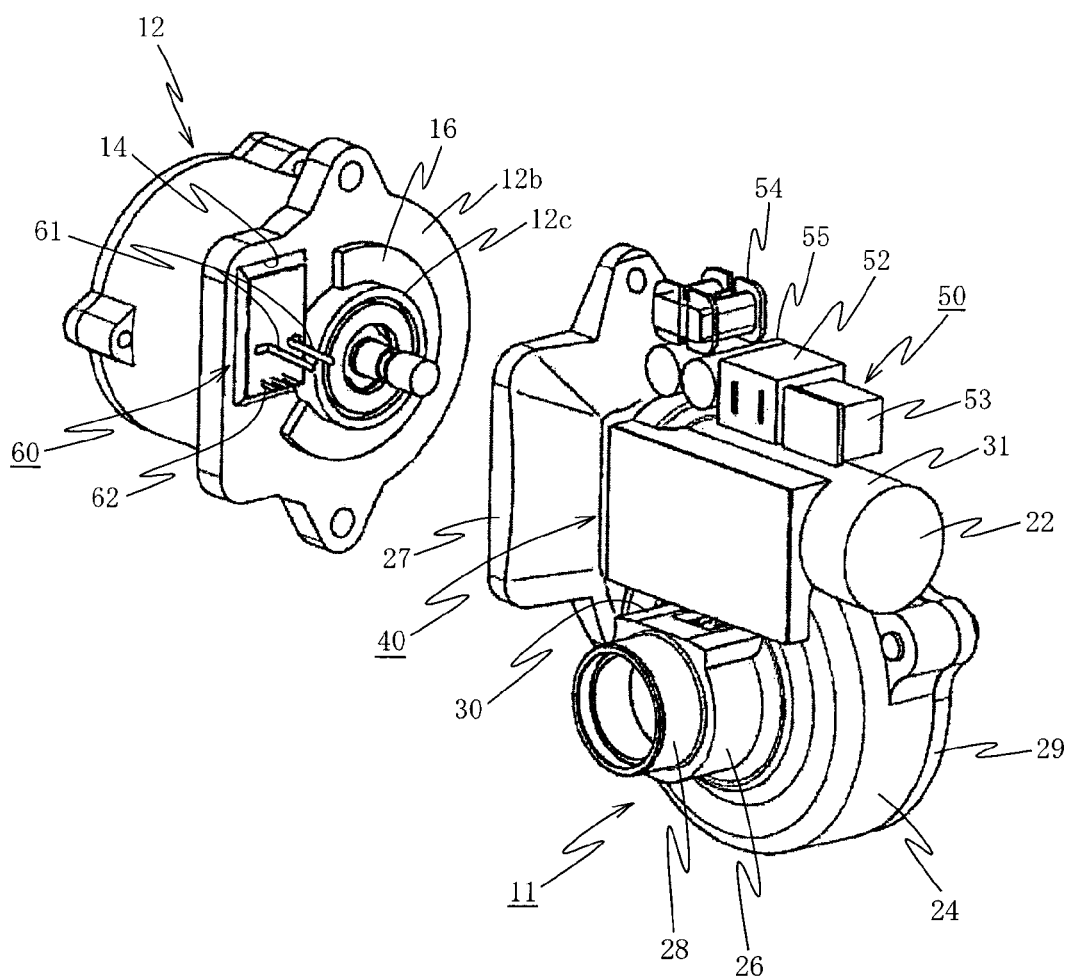
FIG. 10 is an exploded perspective view according to another embodiment of the present invention.
Figure 11:
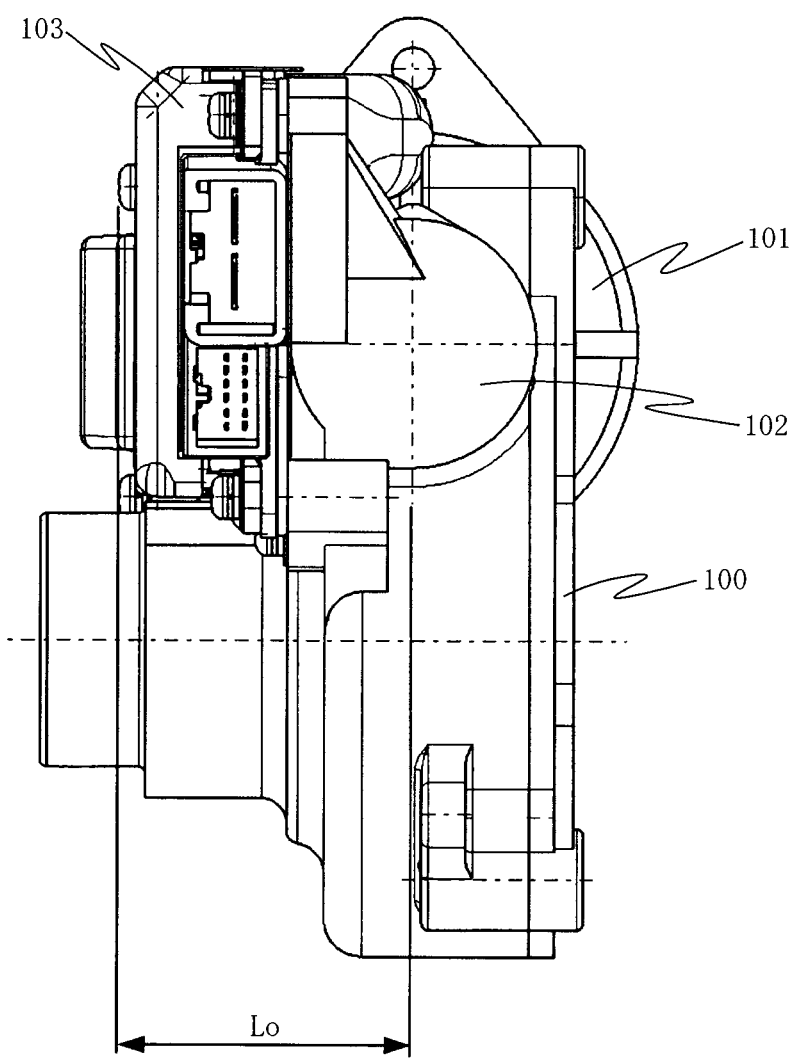
FIG. 11 is a plane view of a conventional example.

Furthermore, in the above embodiment, the description has been given of the case where the drive circuit module 60 including the three-phase inverter at the flange portion 12b of the electric motor 12 does not protrude from the surface of the flange portion 12b. However, the present invention is not limited thereto. Referring now to FIG. 10, the drive circuit module 60 may be arranged to protrude from the surface of the flange portion 12b. In such a case, any recess portion may be provided as long as the drive circuit module 60 is inserted into the gearbox flange 27 of the reduction gearbox 11.

In addition, in the above embodiment, the description has been given of the case where the worm 21 is directly connected to the output shaft 12g of the electric motor 12. However, the present invention is not limited thereto. The output shaft 12g and the worm 21 are separated from each other for coupling by use of the serration coupling, spline coupling, and the like.

Furthermore, in the above embodiment, the description has been given of the case where the control device is divided into three modules including: the control module 40; the connector module 50; and the drive circuit module 60. However, the present invention is not limited thereto. The connector module 50 may be omitted to integrally form the connector and noise-suppressing part into the control module 40.

In addition, in the above embodiment, the description has been given of the case where the present invention is applied to a vehicle with the steering wheel on the right side. However, the present invention is not limited thereto. The present invention may be applicable to a vehicle with the steering wheel on the left side.

Furthermore, in the above embodiment, the description has been given of the case where the present invention is applied to a column assist type of electric power steering device. However, the present invention is not limited thereto. Even when the present invention is applied to a pinion assist type or rack assist type of electric power steering device, the same effects are obtainable. Moreover, in the above embodiment, the description has been given of the case where the resolver 12j is built in the electric motor 12. However, the present invention is not limited thereto. Another type of rotation detecting device such as a hall element may be built in, instead of the resolver 12j.

In addition, in the above embodiment, the description has been given of the case where the surface magnet type of the motor rotor 12i is employed as the electric motor 12. However, the present invention is not limited thereto. Another type of the brushless motor such as an Interior Permanent Magnet (IPM) of brushless motor, an induction motor, or the like is applicable, and any number of phases can be set. Furthermore, a brush motor is applicable other than the brushless motor. In such a case, the resolver 12j and the rotation detecting element are eliminated, and at the same time, the gate of the switching element may be controlled by the control module 40 with an H-bridge circuit configuration in which the drive circuit module 60 is connected to four switching elements in an H shape.

Furthermore, in the above embodiment, the description has been given of the case where the torque sensor 25 is composed of a torque detecting element only and its signal processing circuit is built in the control module 40. However, the present invention is not limited thereto. The torque sensor 25 may be configured with the torque detecting elements 25a and 25b and its signal processing circuit, so that the torque detecting elements 25a and 25b may be built in the reduction gearbox 11 and a signal processing circuit electrically connected to the torque detecting elements 25a and 25b may be provided. In such a case, the signal processing circuit can be calibrated with a single reduction gearbox 11, thereby making it possible to calibrate the signal processing circuit without being affected by the electric motor. Then, the electric motor 12 is assembled with the reduction gearbox 11 in which the signal processing circuit of the torque sensor 25 has been calibrated. Thereafter or therebefore, it is possible to electrically connect the control module 40 and the torque detecting element at the stage where the control module 40 has been assembled, and electrically connect the control module 40 and the drive circuit module 60. This facilitates the assembling operation with ease, and simplifies the assembling process without degrading the accuracy of the torque sensor.

In addition, in the above embodiment, the description has been given of the case where the electric motor 12 is attached to the gearbox flange 27 such that the axial direction of the electric motor 12 separately crosses the steering shaft 2. However, the present invention is not limited thereto. Any direction may be taken as long as it separately crosses the steering shaft 2.

Furthermore, in the above embodiment, the description has been given of the case where the control module attaching portion 30 and the connector module attaching portion 31 are provided at a surface separately crossing the center axis of the reduction gearbox 11. However, the present invention is not limited thereto. They may be provided at a surface separately crossing the center axis of the reduction gearbox 11.

INDUSTRIAL AVAILABILITY

An electric power steering device is provided to configure a control module that is thin in an axial direction of a steering shaft, when a control unit is attached to the reduction gearbox.

REFERENCE SIGNS LIST

1 steering wheel, 2 steering shaft, 3 steering column, 11 reduction gearbox, 12 electric motor, 12a motor frame, 12b flange portion, 12c motor stator, 12e in low protrusion, 12g output shaft, 12i motor rotor, 12j resolver, 21 worm, 22 worm housing portion, 23 worm wheel, 24 worm wheel housing portion, 25 torque sensor, 26 torque sensor housing portion, 27 gearbox flange, 28 column attaching portion, 30 control module attaching portion, 31 connector module attaching portion, 40 control module, 41 circuit board, 50 connector module, 51 insulation case, 52 power supply connector 52, 53 signal connector, 54 coil, 55 condenser, 60 drive circuit module, 61 power feeding terminal, 62 gate signal terminal, 63 resolver signal terminal

The invention claimed is:

1. An electric power steering device comprising:
a steering column in which a steering shaft for transmitting a steering torque is built;
an electric motor for transmitting a steering assist force through a gear mechanism in a gearbox to the steering shaft; and
a control device for driving and controlling the electric motor,
wherein the control device including at least:
a drive circuit module including a switching element for driving the electric motor; and
a control module, mounted on the gearbox, for controlling the drive circuit module, wherein the drive circuit module is mounted on a flange portion in a housing of the electric motor.

2. The electric power steering device according to claim 1, wherein the drive circuit module is mounted on a flange portion in the housing of the electric motor.

3. The electric power steering device according to claim 2, wherein steering torque detecting means is arranged at an inner circumferential surface opposing the steering shaft of the gearbox, the control module is arranged at an external circumferential surface side opposing the steering torque detecting means, and a connection terminal of the steering torque detecting means is electrically connected directly to the control module.

4. The electric power steering device according to claim 1, wherein steering torque detecting means is arranged at an inner circumferential surface opposing the steering shaft of the gearbox, the control module is arranged at an external circumferential surface side opposing the steering torque detecting means, and a connection terminal of the steering torque detecting means is electrically connected directly to the control module.

5. The electric power steering device according to claim 1, wherein the gear mechanism includes:
a worm wheel coupled to the steering shaft; and
a worm coupled to an output shaft of the electric motor meshing the worm wheel.

6. The electric power steering device according to claim 5, wherein the control module is arranged closely to an intersection point of an outer circumferential edge of a worm wheel housing portion for housing the worm and the center axis of the worm, along a plane surface orthogonally crossing the center axis of the steering shaft.

7. The electric power steering device according to claim 1, wherein the electric motor is composed of a brushless motor including a rotation angle detecting device built therein, and the drive circuit module is composed of a multi-phase inverter in accordance with a number of phases of the brushless motor.

8. The electric power steering device according to claim 1, wherein the electric power steering device is structurally configured such that an entirety of an electrical connection between the drive circuit module and a coil of the electric motor is fully enclosed within the electric power steering device.

9. An electric power steering device comprising:
a steering column in which a steering shaft for transmitting a steering torque is built;
an electric motor for transmitting a steering assist force through a gear mechanism in a gearbox to the steering shaft; and a control device for driving and controlling the electric motor,
wherein the control device including:
a drive circuit module including a switching element for driving the electric motor, the drive circuit module being mounted on a flange portion in a housing of the electric motor;
a control module for controlling the drive circuit module, and mounted on a surface crossing a center axis of the gearbox; and
a connector module including a power supply connector and a noise-suppressing part, the connector module being mounted on a surface crossing the center axis of the gearbox and adjacent to the control module.

10. The electric power steering device according to claim 9, wherein the drive circuit module is mounted on a flange portion in the housing of the electric motor.

11. The electric power steering device according to claim 9, wherein the gear mechanism includes:
a worm wheel coupled to the steering shaft; and
a worm coupled to an output shaft of the electric motor meshing the worm wheel.

12. The electric power steering device according to claim 9, wherein the electric motor is composed of a brushless motor including a rotation angle detecting device built therein, and the drive circuit module is composed of a multi-phase inverter in accordance with a number of phases of the brushless motor.

13. The electric power steering device according to claim 9, wherein steering torque detecting means is arranged at an inner circumferential surface opposing the steering shaft of the gearbox, the control module is arranged at an external circumferential surface side opposing the steering torque detecting means, and a connection terminal of the steering torque detecting means is electrically connected directly to the control module.

14. The electric power steering device according to claim 9, wherein the electric power steering device is structurally configured such that an entirety of an electrical connection between the drive circuit module and a coil of the electric motor is fully enclosed within the electric power steering device.

15. An electric power steering device comprising:
a steering column in which a steering shaft for transmitting a steering torque is built;
an electric motor for transmitting a steering assist force through a gear mechanism in a gearbox to the steering shaft; and
a control device for driving and controlling the electric motor, the control device including at least:
a drive circuit module including a switching element for driving the electric motor, and mounted on a housing of the electric motor; and
a control module, mounted on the gearbox, for controlling the drive circuit module, wherein
the drive circuit module is mounted on a flange portion in the housing of the electric motor, and
steering torque detecting means is arranged at an inner circumferential surface opposing the steering shaft of the gearbox, the control module is arranged at an external circumferential surface side opposing the steering torque detecting means, and a connection terminal of the steering torque detecting means is electrically connected directly to the control module.

* * * * *